United States Patent [19] [11] 3,859,655
Van Duuren [45] Jan. 7, 1975

[54] SYSTEM FOR THE TRANSFER OF TWO STATES BY MULTIPLE SCANNING

[75] Inventor: Hendrik Cornelis Anthony Van Duuren, Wassenaar, Netherlands

[73] Assignee: De Staat Der Nederlanden, Ten Deze Vertegenwoordigd Door De Directeur Generaal Der Posterijen, Telegrafie En Telefonie, The Hague, Netherlands

[22] Filed: Jan. 18, 1974

[21] Appl. No.: 434,829

Related U.S. Application Data

[63] Continuation-in-part of Ser. No. 185,741, Oct. 1, 1971, abandoned.

[30] Foreign Application Priority Data

Oct. 1, 1970 Netherlands ....................... 7014414

[52] U.S. Cl. ........................................... 340/347 DD
[51] Int. Cl. ............................................. G06f 5/00
[58] Field of Search .............. 340/347 DD, 146.1 R; 360/39, 40, 42

[56] References Cited

UNITED STATES PATENTS

| | | | |
|---|---|---|---|
| 3,623,041 | 11/1971 | MacDougall | 360/40 |
| 3,631,429 | 12/1971 | King | 360/40 |
| 3,659,286 | 4/1972 | Perkins et al. | 340/347 DD |

*Primary Examiner*—Charles E. Atkinson
*Attorney, Agent, or Firm*—Anthony A. O'Brien

[57] ABSTRACT

A system is disclosed for transferring between a transmitter and a receiver information regarding the point of time and the direction of transition between two operating states of biphase input signals. The transmitter has a scanning device and an encoding device with the former being a clock pulse controlled shift register adapted to scan the input signals and control the encoding device. The encoding device is formed by a plurality of gates adapted to represent the direction of transition by a code word having a fixed number of bits. The receiver has a reforming device adapted to decode the received code word and reform the transitions. The reforming device includes a shift register having one place in excess of the fixed number of bits and a logic circuit capable of effecting a majority decision with regard to some places in the shift register to determine directions of transition.

9 Claims, 6 Drawing Figures

SYSTEM FOR THE TRANSFER OF TWO STATES BY MULTIPLE SCANNING

CROSS-REFERENCE TO RELATED APPLICATION

This is a continuation-in-part application of copending application Ser. No. 185,741 filed Oct. 1, 1971 and now abandoned.

BACKGROUND OF THE INVENTION

1. Field of the Invention

The present invention relates to a system for the transfer of information concerning point of time and direction of transitions between two states of an input waveform.

2. Description of the Prior Art

In an article by Travis and Yaegar in Bell Systems Technical Journal, Oct. 1965, pages 1,567–1,604, and particularly pages 1,573 and 1,575, which article is incorporated herein by reference, a system for transferring information relating to point of time and direction of transition between two states of an input waveform is described. The system includes at a transmitting end, a scanning device and an encoding device, which scanning device includes a shaft register controlled by clock pulses for scanning the input waveform at a fixed repetition rate and for controlling the encoding device, and which encoding device includes a plurality of gates for representing, in a code word having a fixed number of bits, the direction of transition and a place in a fixed repetition timing pattern. The control initiates a code work in a fixed position in the first timing pattern after the point of time of the transition and lays down the direction of the transition in a fixed place in the code word. The duration of each timing pattern must be selected such that the number of bits of the code word does not exceed the number of timing patterns per shortest distance to be expected between transitions divided by a selected multiple. At a receiving end there is a reforming device for reforming the transitions by decoding received code words.

As discussed in the article, the code words includes a single bit for the indication of the direction of the transition, and a resulting drawback in the use of the above system is that a single error in the transfer of a code word may lead to an unallowable deformation of the transition. Under certain circumstances, it is even possible that a transition cannot be detected due to the occurrence of a single error or, contrariwise, a transition can be simulated.

SUMMARY OF THE INVENTION

The present invention is summarized in a system for the transfer of information relating to the point of time and direction of transitions between two states of a biphase input signal including a transmitting means having means to scan the biphase input signal at a fixed repetition rate, and encoding means responsive to the scanning means and having means representing the input signal in a code word having a plurality of bits indicating the direction of transition and at least one bit indicating the time of occurrence of the transition relative to a fixed pattern of repetition time intervals, wherein the fixed pattern is repeated at a selective multiple of the repetition time intervals, and a receiving means having shift register means including an input and a plurality of stages receiving the code word and additionally including one stage in excess of the number of bits in the code word, output means generating a biphase output signal, and logic circuit means connected to the shift register stages for controlling the state of the output means in accordance with the code word bits in the shift register stages, the logic circuit means being capable of effecting a majority decision as regards a plurality of shift register stages including the excess stage to ascertain the direction of the transition.

It is an object of the present invention to detect the occurrence of transitions between two states of a biphase signal and to reform same with a high degree of reliability.

Another object of the present invention is to indicate the direction of a transition between two states of a biphase signal by a plurality of code word bits such that a majority decision may be made based upon the plurality of bits and an additional bit indicating the state of the biphase signal prior to the transition as an indication of the direction of the transition.

The application of bits to a transmitting end so as to be able to take a majority decision at a receiving end is known per se, for example from the above article, page 1,588. From the following description of the preferred embodiments of the present invention, it appears that the inclusion of such a majority decision feature in the system described in the article may offer particular advantages as regards the reduction of the deformation occurring as a result of disturbed transfer caused by the occurrence of single errors. The preferred embodiments of the present invention encompass systems having the means required for this purpose.

Further objects and advantages of the present invention will become apparent from the following descriptions of the preferred embodiments taken in conjunction with the accompanying drawings.

DESCRIPTION OF THE PREFERRED EMBODIMENTS

Figure 1:
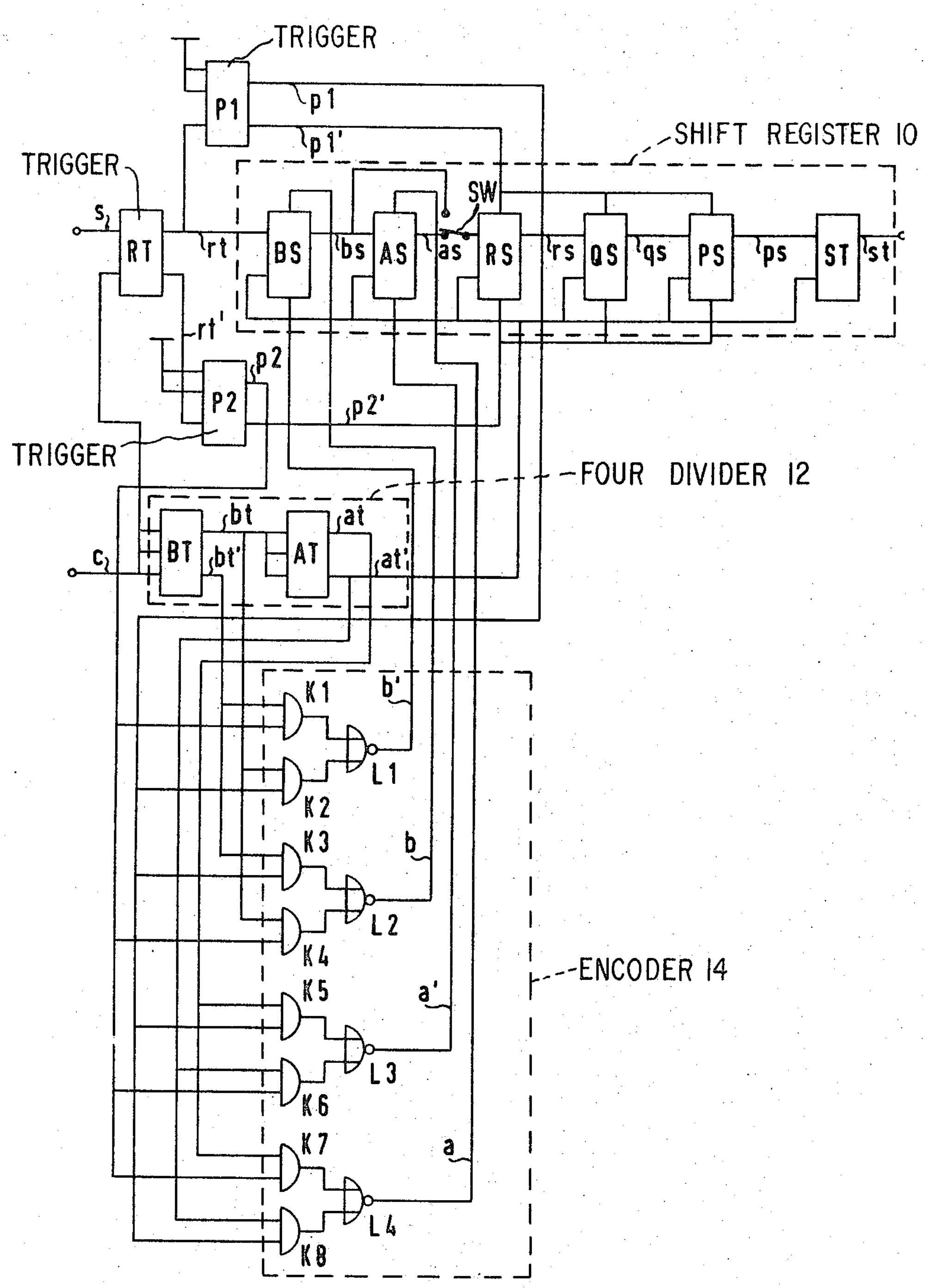
FIG. 1 is a schematic circuit diagram of the transmitting end of a system in accordance with the present invention.

In FIG. 1, an output rt of a D-type trigger RT for scanning the two states of an input s under the control of a series of clock pulses at input *c* is included in an input of a shift register 10 which includes D-type trigger stages BS, AS, RS, QS, PS and ST, with state ST constituting a transmit trigger to an output st. The shift register 10 is adapted to progress on the transition of the state at an output *at'* at a four-divider 12, which includes J-K master-slave triggers BT and AT, in response to the series of clock pulses presented at the input *c*. Furthermore, the trigger RT constitutes an input for the single-shot triggers P1 and P2, in which P1 can detect a transition on the input *s* of a state 0 to a state 1 by means of the output *rt*, and P2 can detect a transition in the opposite direction by means of an output *rt'*. Outputs *p1'* and *p2'* of triggers P1 and P2, respectively, are connected to inputs of the trigger stages RS, QS and PS for simultaneously bringing them into one of their two states. The output P1 and *p2* of p1 and P2, respectively, are connected to inputs of an encoding device 14. Four other inputs of the encoding device are connected to outputs *bt* and *bt'* of trigger BT and to outputs *at* and *at'* of trigger AT. The encoding device comprises 8 AND gates K1, ---, K8 and 4 NOR gates L1, ---, L4 for forming the logic functions $b = (bt.p2 + bt'.p1\ )'$ and $b' = (bt'.p2 + bt.p1\ )'$ for setting and resetting, respectively, the trigger stage BS, and the logic functions $a = (at.p2 + at'.p1\ )'$ and $a' = (at'.p2 + at.p1\ )'$ for setting and resetting, respectively, the trigger stage AS.

By means of a switch SW, an output *bs* of the trigger stage BS can be directly connected to an input of the trigger stage RS instead of via the trigger stage AS, so that AS is disconnected.

Figure 2:
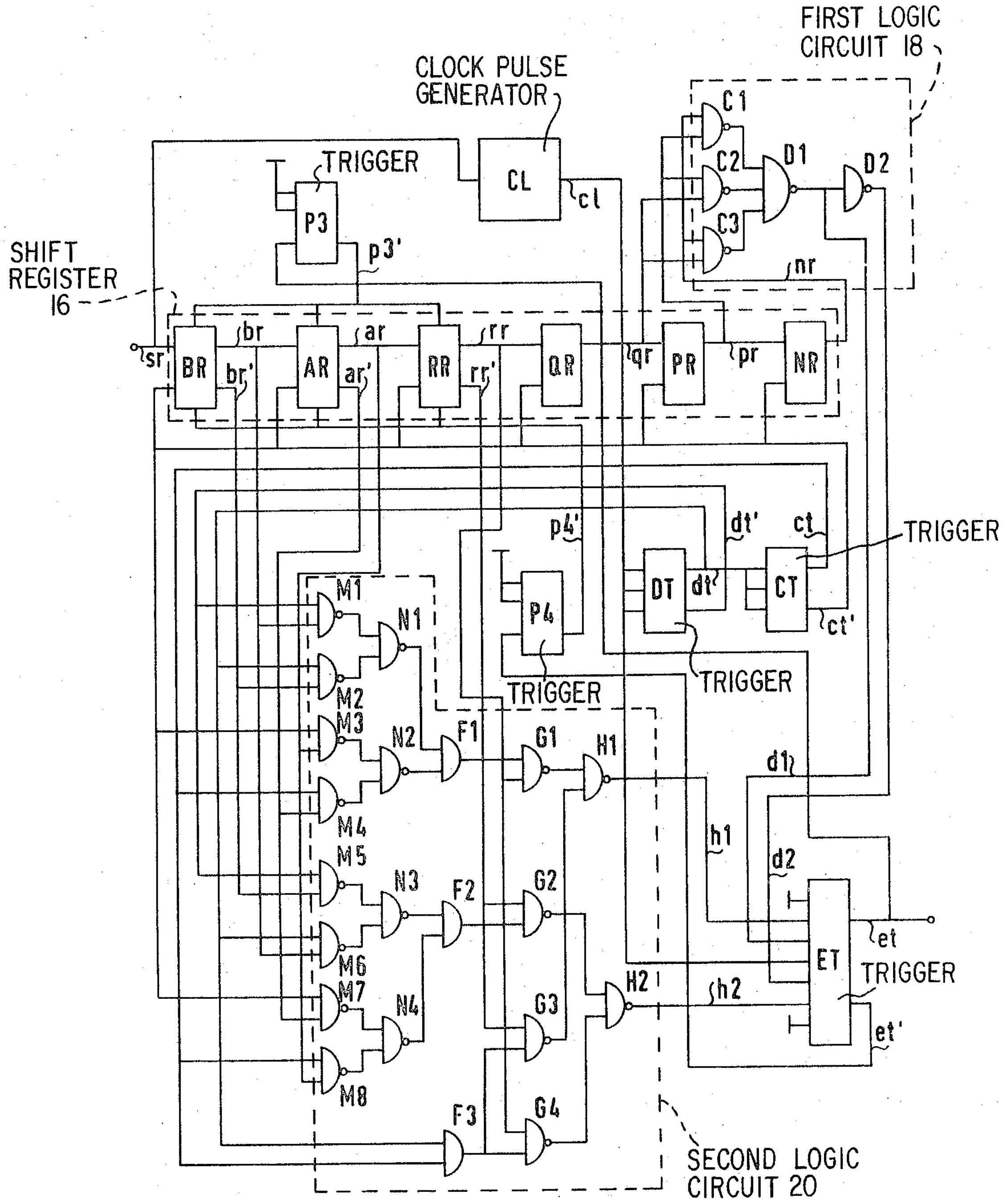
FIG. 2 is a schematic circuit diagram of a receiving end of the system in accordance with the present invention for the case where 5-bit code words are utilized.
Figure 3:
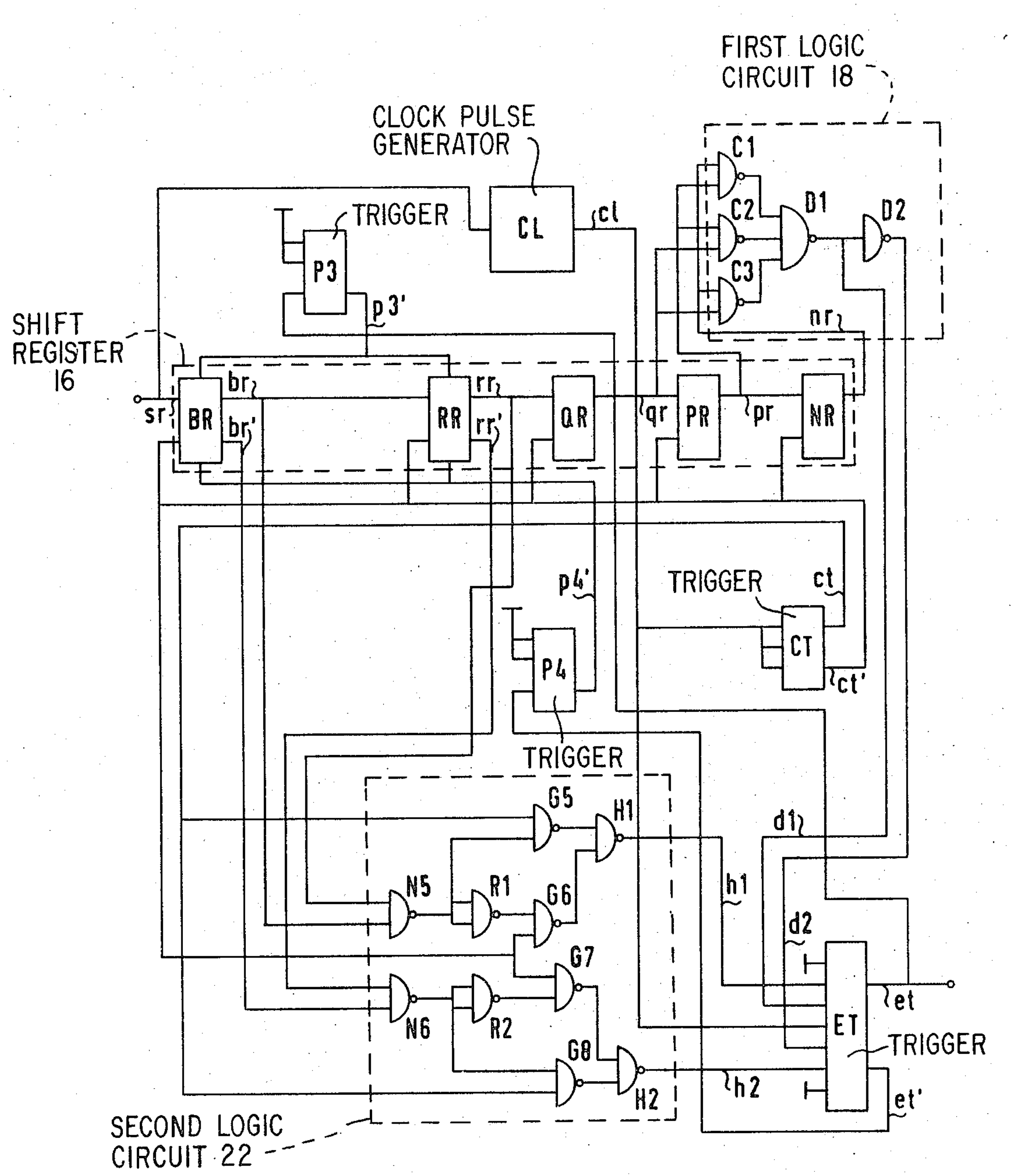
FIG. 3 is a schematic circuit diagram of another embodiment of a receiving end of the system in accordance with the present invention for the case where 4-bit code words are utilized.

In the most similar manner possible, FIGS. 2 and 3 show embodiments of a reforming device for the transitions as these are laid down in 5-bit and 4-bit code words, respectively. An incoming signal received at input *sr*, from output *st* of FIG. 1, is introduced into a clock pulse generator CL for synchronization and into an input of a shift register 16 comprising the trigger stages BR, ---, NR. This shift register progresses on the changes of the state of the output *ct'* of the trigger CT, which changes are obtained from a series of clock pulses *cl* generated by the generator CL and divided by means of the J-K master-slave triggers DT and CT. A first logic circuit 18 consisting of the NAND gates C1, C2, C3, D1 and D2 combines the states of the outputs *gr* of trigger stages QR, *pr* of stage PR, and *nr* of stage NR for obtaining a "2 out of 3" decision in accordance with the logic functions $dl = ((qr.pr)'\ .\ (qr.nr)'\ .\ (pr.nr)')$ $d2 = d1'$ A second logic circuit 20 is present for determining, in accordance with the bits contained in the trigger stages BR, AR and RR, the particular time interval in a timing cycle in which the transition occurs. In FIG. 2, this second logic circuit 20 is constituted by the NAND gates M1, ---, M8, N1, ---, N4, G1, ---, G4, H1, H2 and the AND gates F1, F2 and F3 for combining the outputs *br* and *br'* of trigger stage BR, *ar* and *ar'* of stage AR, *rr* and *rr'* of stage RR and *ct* and *ct'* of stage CT and *dt* and *dt'* DT. In FIG. 3, the second logic circuit 22 is constituted by the NAND gates N5, N6, R1, R2, G5, ---, G8, H1 and H2 for combining the similarly indicated outputs of the trigger stages BR, RR and trigger CT.

The second logic circuit 20 in accordance with FIG. 2 produces the following logic functions:

$fl = ((dt'.br)'\ .\ (dt.br')')'\ .\ ((ct'.ar)'\ .\ (ct.ar')')',$ $f2 = ((dt'.br')'\ .\ (dt.br))'\ .\ ((ct'.ar')'\ .\ (ct.ar)')',$ $f3 = (dt.ct),$ $hl = (fl.rr)'\ .\ (f3.rr')',$ $h2 = (f3.rr)'\ .\ (f2.rr')'$

The second logic circuit 22 in accordance with FIG. 3 produces the following logic functions:

$h1 = (ct.(br.rr)'\ )'\ .\ (\ (br.rr)\ .\ ct')'$ $h2 = (ct.(br'.rr')'\ )'\ .\ (\ (br'.rr').ct')'$

The reforming device further comprises a J-K trigger ET having setting inputs for the functions h1 and d1 and resetting inputs for the functions *h2* and *d2*. The progress pulses for the trigger ET are directly derived from output *cl* of *CL*. The mutually opposite output states *et* and *et'* of ET control the single-shot triggers P3 and P4, respectively, which single-shot triggers are connected through outputs *p3'* and *p4'* to inputs of the shift register triggers BR, AR and RR for simultaneously setting or resetting same. The output et is at the same time the output for the reformed transitions.

A system having a device as shown in FIG. 1 at the transmitting end and a device as shown in FIG. 2 at the receiving end can be used in an at least 20-fold scanning of the state at the input *s*. The code to be used for this scanning, as it is laid down in the encoding device, is shown in Table A. The repetitive timing patterns each comprise four repetition time intervals, which are numbers 0, 1, 2 and 3 in a fixed sequence. The code word is indicated by *p q r a b*.

TABLE A

| transition from 1 to 0 (b a r q p) | place in pattern | transition from 0 to 1 (b a r q p) |
|---|---|---|
| 0 0 0 0 0 | 0 | 1 1 1 1 1 |
| 1 0 0 0 0 | 1 | 0 1 1 1 1 |
| 0 1 0 0 0 | 2 | 1 0 1 1 1 |
| 1 1 0 0 0 | 3 | 0 0 1 1 1 |

In Table A and the other tables, the code words are written in the reversed sequence *b a r q p* in connection with their places in the shift registers. At the receiving side (FIG. 2) the places *b a r* in a code word *b a r q p* are interpreted in accordance with Table B.

TABLE B

| transition from 1 to 0 (b a r) | place in pattern | transition from 0 to 1 (b a r) |
|---|---|---|
| 0 0 0 | 0 | 1 1 1 |
| 1 0 0 | 1 | 0 1 1 |
| 0 1 0 | 2 | 1 0 1 |
| 1 1 0 | 3 | 0 0 1 |
| 0 1 1 | 3 | 1 0 0 |
| 1 0 1 | 3 | 0 1 0 |
| 1 1 1 | 3 | 0 0 0 |
| 0 0 1 | 3 | 1 1 0 |

The code word is detected in the incoming signal sr by the majority decision d1 and d2 as regards the state of three places in the shift register, viz, trigger stages NR, PR and QR. In fact, a 6-bit code word *n p q r a b* in the signal sr is looked for. Due to errors in the transmission path, a word detected at the receiving end does not have to be identical to a transmitted word *p q r a b*, since a single error does not prevent the detection of a code word. The deformation occurring in this procedure amounts to maximally 20 percent. In some cases, the deformation is less due to a correcting effect as a result of the choice of the code for the place in a pattern. This effect is elucidated by FIG. 4, in which in a time sequence diagram, a plurality of possible series of results of the scanning at the receiving end are considered with respect to point of time and direction of a transition encoded in the series of received bits. If no errors occur, the code word *p q r a b* transmitted for the transition lies in the series *m n p q r a b c d*.

Figure 4:
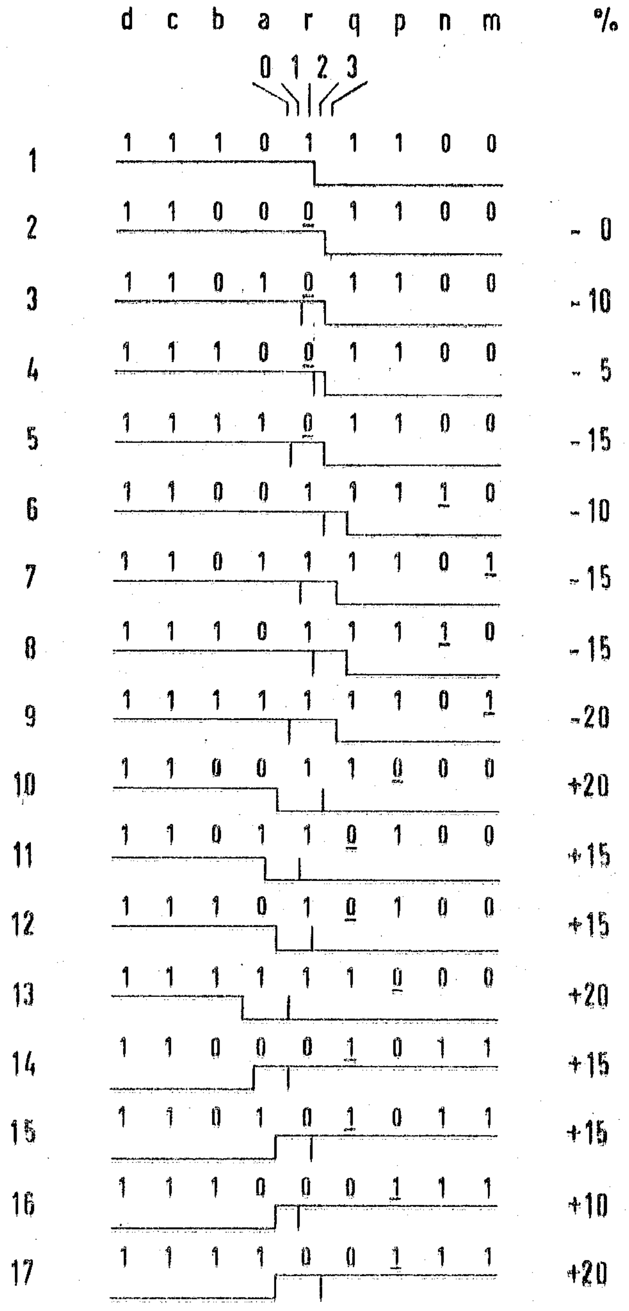
FIG. 4 is a table showing possible states as a result of the occurrence of single errors in the receiving end of the system shown in FIG. 2.

Line 1 of FIG. 4 shows a received errorless signal *sr* as it is returned by the shift register NR, ---, BR. When the bits of the code word *n p q r a b* lie in the correspondingly reformed elements of the shift register, which appears from the majority decision out of the states of trigger stages NR, PR and QR, the state of triggers stages AR and BR are read out and in this case a transition from 0 to 1 in the middle of a time interval 2 of a time pattern appears at the output et of the reforming device.

In lines 2–5 an error has crept into the series in the place *r*. The result is a shift of the reformed transition to one of the other time intervals in the timing cycles in the place *r*. The shift is shown in FIG. 4 as an acceleration (−) or retardation (+) in a percentage of the duration of a code word.

In lines 6–9, an error has crept in one of the places *m* or *n*. As a result thereof, the majority decision is accelerated and, consequently, also the transition.

In lines 10–17, an error in one of the places *p* or *q* causes a retardation of the majority decision. In this case, it depends upon the state in the places c and d how the transition is situated in the timing cycle at the time of a. Lines 10–13 show the four possible situations in the case of a transition from 0 to 1, while in lines 14–17, the encoded transition relates to a change of state from 1 to 0 which is followed by the reverse transition immediately upon termination of the code word.

The operation of the transmitter of FIG. 1 will now be described for the case where 5-bit code words are utilized to indicate point of time and direction of transitions between two states of an input signal, in accordance with the code schedule of Table A. Accordingly, the switch SW will be connected to the output as of trigger stage AS such that the shift register 10 has six operable stages.

Figure 5:
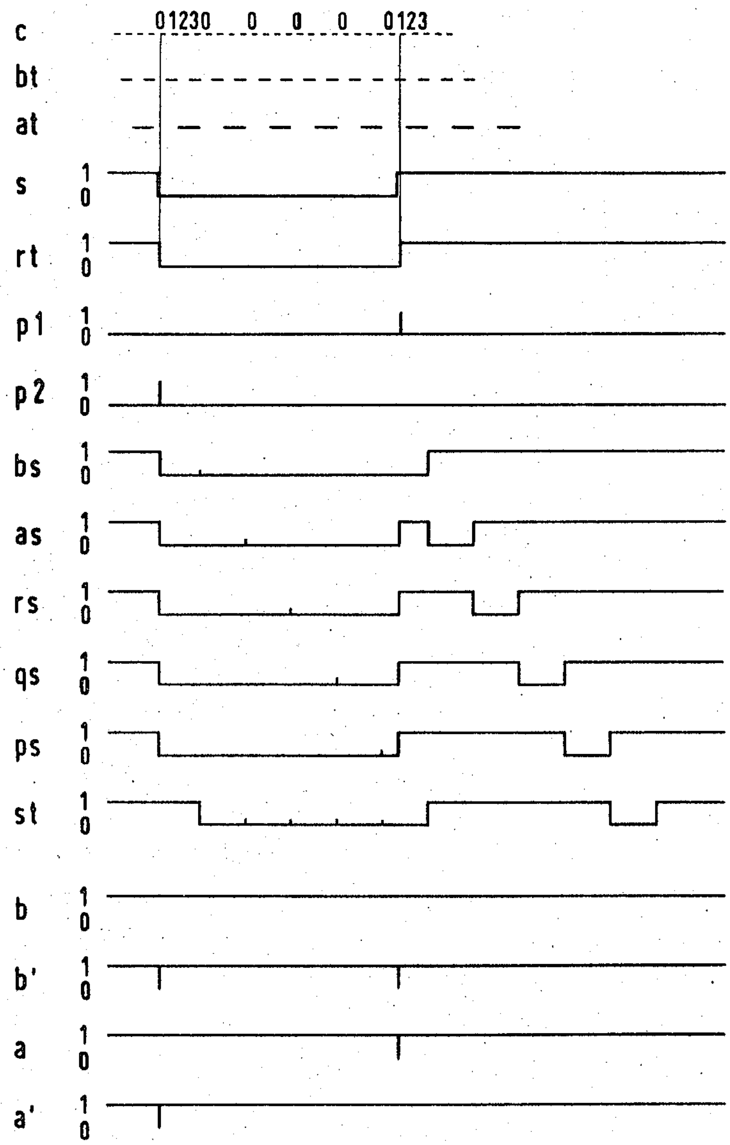
FIG. 5 is a time sequence diagram of states in the components of the transmitting end of the system shown in FIG. 1.

Initially, assume that the signal applied to input *s*, which normally will be varying in random fashion between 0 and 1 states, has been at the same state for at least six time patterns, as determined by six shift register stepping control pulses produced by the four divider 12 at output *at'* in response to the continuous clock pulses at input *c*. Accordingly, any previous code word which may have been set up in the shift register 10 will have been stepped along and completely transmitted at output *st*. Presuming the initial state of input *s* to be the 1 state, for example, as shown in FIG. 5, then each of the stages BS, AS, RS, QS, PS and ST will likewise initially be at the 1 state while awaiting the next code word. Upon each subsequent occurrence of a stepping control pulse at output *at'*, the 1 states in the stages will be shifted to subsequent stages and serially outputed at st for transmission to the receiver of FIG. 2 with stage BS receiving a new 1 state signal from input *s*.

Under conditions of no transition occurring between states of the biphase signal at input *s*, the transition detecting single-shot triggers *P*1 and *P*2 remain in their dormant state, continuously producing 0 state outputs at *p*1 and *p*2 and 1 state outputs at *p*1' and *p*2'. Since one input of each AND gate K1, K2, ---, K8 of encoder 14 is energized by outputs *p*1 or *p*2 at the 0 state, all outputs of the AND gates are likewise initially at the 0 state which, when applied in pairs to the inputs of the four NOR gates L1, L2, L3 and L4, results in encoder outputs *a, a', b* and *b'* energized at the 1 state continuously during operation without transitions in the signal at input *s*.

Under such initial condition, the set and reset inputs of the stages BS and AS all remain equally energized at the 1 state by the outputs *a, a', b* and b' of the encoder 14 and, accordingly, stages BS and AS are not effected thereby and are maintained at the 1 state being stepped therethrough.

Likewise, output p1' and p2' of the single-shot triggers P1 and P2 are both continuously energizing the set and reset inputs, respectively, of stages PS, QS and RS at the 1 states. Accordingly, stages PS, QS and RS are neither set nor reset and are also maintained at the 1 states being stepped therethrough.

Now in the event of the first transition of the signal at input *s*, from the initial 1 state to the 0 state, which is sensed by the single-shot trigger *P*2, outputs *p*2 and *p*2' assume instantaneous 1 and 0 states, respectively. The instantaneous 0 state on *p*2' causes the stages PS, QS and RS of the shift register 10 to be encoded by each being immediately reset to the 0 state as an indication of the direction of transition.

In addition, stages AS ane BS of the shift register 10 will also be encoded in accordance with the time of the transition with reference to one of the four time intervals 0, 1, 2 and 3 in the time pattern in which the transition occurred. As shown in FIG. 5, the first transition falls within the time interval 0, and the four-divider 12 has outputs at and bt both at the 0 state and, accordingly, outputs *at'* and *bt'* both at the 1 state. In accordance with the logic functions operation previously set forth for encoder 14, the outputs of the AND gates K1 and K6 will instantaneously change to the 1 state and, consequently, outputs *a'* and *b'* of the NOR gates L1 and L3 will instantaneously change to the 0 state, thereby causing shift register stages AS and BS to reset to 0 states. Thus, stages BS, AS, RS, QS and PS of the shift register 10 have been encoded by being instantaneously changed to 0 states in response to the 1–9 transition at the 0 time interval in the time pattern, which is in accordance with Table A. The 5-digit code word will then be stepped through the shift register 10, under control by output *at'*, to output st for transmission to the receiver of FIG. 2, to be followed by a series of 0 state signals commensurate with the number of timing cycles in excess of five that the waveform at input s remains at the 0 state.

Figure 6:
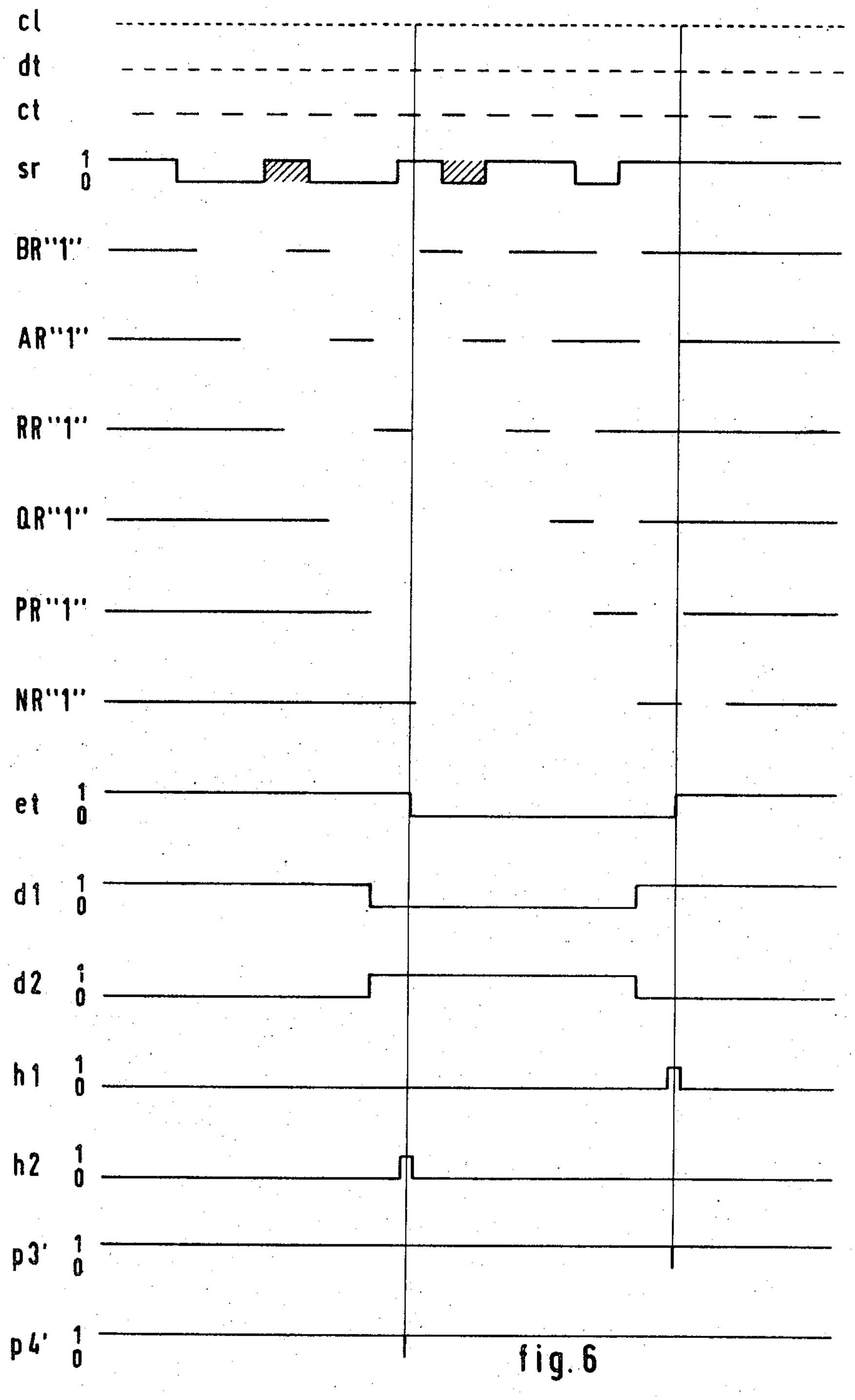
FIG. 6 is a time sequence diagram of states in the components of the receiving end of the system shown in FIG. 2.

After a number of timing cycles, the waveform at input *s* will undergo a second transition, from the 0 state back to the 1 state. As shown in FIG. 6, the second transition occurs in timing interval 1 in the fifth timing cycle following the timing cycle in which the first transition occurred. The second transition is sensed by the single-shot trigger P1. In response to the occurrence of the second transition, the outputs *p*1 and *p*1' assume instantaneous 1 and 0 states, respectively, resulting in the outputs of AND gates K2 and K8 instantaneously changing to the 1 state and thereby causing the outputs *b'* and a of NOR gates L1 and L4 to instantaneously change to 0 states. The instantaneous 0 state output *b'* causes stage AS to be set to the 1 state, thereby encoding the point of time information.

In addition, the output *p*1', in instantaneously changing to the 0 state in response to the transition, causes each of the stages PS, QS and RS to immediately be set to the 1 state indicating the direction of the transition, thereby completing the 5-bit code word 0-1-1-1-1, indicating a transition from the 0 state to the 1 state at time interval 1 as set forth in Table A. Thereafter, the code word will be stepped through the shift register 10 to output st, followed by a series of 1 state signals commensurate with the number of time patterns in excess of five that the signal at input s remains at the 1 state before the next transition.

In the operation of the receiver of FIG. 2, the signal received at input sr of the receiver will normally be identical to that generated at the output st of the transmitter of FIG. 1 in the absence of any disturbance during transfer. Now, assuming that the waveform at input sr and the output at et of trigger ET have been at the 1 state for at least three timing cycles after the last detected transition, then each stage of the shift register 16 will be at the 1 state. When the code word 0-0-0-0-0 representing the first transition, from the 1 state to the 0 state at time interval 0, reaches input *sr*, then each subsequent time pattern will admit and step along the 0 state bits into shift register 16. As the code word bits are being serially entered into the shift register 16, the first logic circuit 18 is continually monitoring stages NR, PR and QR and providing outputs at d1 and d2 indicative of the majority status of these latter three stages, which majority status is initially 1. Thus, output d1 is initially at the 1 state and output *d*2 is initially at the 0 state in response to the initial majority of 1 states in shift register stages NR, PR and QR. When he 5-digit code word reaches stage PR such that such of the stages PR, QR, RR, AR and BR contains a bit of the complete code word of five serial 0 states, the first logic circuit 18 responds to the new majority of 0 states and changes its output *d*1 to the 0 state while simultaneously changing its output *d*2 to the 1 state. Thus, the trigger *et* is made ready, by *d*2 assuming the 1 state, to shift the amplitude of the signal at output et from the initial 1 state to a 0 state at the proper time interval in the proper time pattern.

The proper time interval of the transition is determined by the code word bits in stages AR and BR in conjunction with the outputs from the four divider triggers DT and CT. The trigger ET will reset to a 0 state at output et upon the occurrence, as determined by logic circuit 20, of a pulse at output *h*2 in accordance with the particular time interval in which the transition from the 1 state to the 0 state occurred, and the next pulse from the clock CL. Since the transition occurred when the four divider outputs BT and AT of the transmitter of FIG. 1 were both at the 0 state, when the output *h*2 of the second logic circuit 20 will only reach the 1 state when the four divider outputs *dt* and *ct* are both at the 0 state. Thus, at time interval 0, output *et* of the trigger changes from the 1 state to the reset or 0 state while the inverted output *et'* changes from the 0 state to the the 1 state in accordance with Table B.

Upon the occurrence of the transition at output et and *et'*, trigger P4 responds to the output *et'* changing to the 1 state and generates a pulse at output *p*4' to the reset inputs of stages BR, AR and RR of shift register 16 to reset these stages to the 0 state, thereby cancelling out the information relating to the point of time of the transition and replacing it with time interval 0 information. However, inasmuch as these stages already were indicating time interval 0, no change results and they merely maintain their 9 states.

Thereafter, trigger ET will only produce a subsequent transition back to the 1 state upon both outputs *d*1 and *h*1 being simultaneously at the 1 state. Accordingly, the shift register 16 will continually receive 0 state inputs at sr until the arrival of the next code word, but these inputs will have no further effect on the receiver of FIG. 2.

Now, as seen in FIG. 5, the waveform at the input s of the transmitter of FIG. 1 underwent a second transition back to the 1 state at time interval 1, thereby establishing a new code word 0-1-1-1-1, with bits 0–1 indicating the point of time of the transition and bits 1-1-1 indicating the direction of the transition in accordance with the schedule of Table A. This second code word will be serially entered into shift register 16 and stepped along the shift register stages in normal fashion. When the complete code word is entered in the shift register such that states PR, QR, RR, and AR are at the 1 state and stage BR is at the 0 state, the first logic circuit 18 will detect the presence of a new majority of 1 states at its inputs (NR is at the 0 state). In response to the new majority of 1 states in stages NR, PR and QR, output d1 of the first logic circuit 18 changes from the 0 state to a 1 state, and the output *d*2 simultaneously changes from the 1 state to an 0 state, thereby readying trigger ET to be set upon the occurrence of a pulse at output h1 of the second logic circuit 20 at the proper time interval in accordance with the code word bit in shift register stages BR and AR and the schedule of Table B. Thus, when the four divider outputs DT and CT are at 1 and 0 states, respectively, indicating a time interval 1 transition, the output h1 of the second logic circuit 20 changes to the 1 state, thereby causing output et to change to the 1 state. The trigger *P*3 produces an output pulse at *P*3' in response to the change at output et to thereby set each of the stages BR, AR and RR to the 1 state which cancels out the point of time information. Thereafter, the input SR of the receiver will receive 1 state signals follows by the next code word indicating the next transition back to the 0 state.

In the system employing the 5-bit code word, the error patterns that may occur, considering single bit error situations only, and the associated formations which result therefrom are as follows:

Example 1

An error at bit *r*. In this case, the start of the transition is detected in the correct bit position of the shift register.

TABLE C

Error → r

| d | c | b | a | r | q | p | n | m | l | Should be time interval | Is detected in part t if: |
|---|---|---|---|---|---|---|---|---|---|---|---|
| 0 | 0 | 0 | 0 | 1 | 0 | 0 | 1 | 1 | 1 | 0 | 3 |
| 0 | 0 | 1 | 0 | 1 | 0 | 0 | 1 | 1 | 1 | 1 | 3 |
| 0 | 0 | 0 | 1 | 1 | 0 | 0 | 1 | 1 | 1 | 2 | 3 |
| 0 | 0 | 1 | 1 | 1 | 0 | 0 | 1 | 1 | 1 | 3 | 3 |

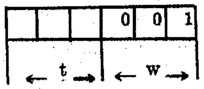

However, the bit r that should have been zero is received as 1, so that the time interval is received incorrectly. In all four cases the *b.a.r.* configuration is interpreted as time interval 3.

TABLE F

| d | c | b | a | r | q | p | n | m | Is detected if (a/) | Should be time interval | Is detected if (b/) | d | c | b | a | r | q | p | n | m |
|---|---|---|---|---|---|---|---|---|---|---|---|---|---|---|---|---|---|---|---|---|
| 0 | 0 | 0 | 0 | 0 | x | x | 1 | 1 | 0 | 0 | 1 | 1 | 1 | 0 | 0 | 0 | x | x | 1 | 1 |
| 0 | 0 | 1 | 0 | 0 | x | x | 1 | 1 | 2 | 1 | 3 | 1 | 1 | 1 | 0 | 0 | x | x | 1 | 1 |
| 0 | 0 | 0 | 1 | 0 | x | x | 1 | 1 | 3 | 2 | 3 | 1 | 1 | 0 | 1 | 0 | x | x | 1 | 1 |
| 0 | 0 | 1 | 1 | 0 | x | x | 1 | 1 | 3 | 3 | 3 | 1 | 1 | 1 | 1 | 0 | x | x | 1 | 1 |

← t → ← w →   a/   b/   ← t → ← w →

Example 2

The majority decision of a transition is accelerated by one bit. This may happen as a result of an error at bit n or at bit m.

Example 4

The bit value transition is detected at the correct moment but the bit a is received incorrectly.

TABLE D

Error (at m) / Error (at n)

| d | c | b | a | r | q | p | n | m | d | c | b | a | r | q | p | n | m | Should be time interval | Is detected if |
|---|---|---|---|---|---|---|---|---|---|---|---|---|---|---|---|---|---|---|---|
| 0 | 0 | 0 | 0 | 0 | 0 | 0 | 1 | 0 | 0 | 0 | 0 | 0 | 0 | 0 | 0 | 0 | 1 | 0 | 0 |
| 0 | 0 | 1 | 0 | 0 | 0 | 0 | 1 | 0 | 0 | 0 | 1 | 0 | 0 | 0 | 0 | 0 | 1 | 1 | 0 |
| 0 | 0 | 0 | 1 | 0 | 0 | 0 | 1 | 0 | 0 | 0 | 0 | 1 | 0 | 0 | 0 | 0 | 1 | 2 | 1 |
| 0 | 0 | 1 | 1 | 0 | 0 | 0 | 1 | 0 | 0 | 0 | 1 | 1 | 0 | 0 | 0 | 0 | 1 | 3 | 1 |

0 1 0   ← t → ← w →   0 0 1   ← t → ← w →

Example 3

The majority decision of a transition is retarded by one bit. This may happen as a result of an error at bit *q* or at bit *p*.

TABLE G

| d | c | b | a | r | q | p | n | m | Should be time interval | Is detected if |
|---|---|---|---|---|---|---|---|---|---|---|
| 0 | 0 | 0 | 1 | 0 | 0 | 0 | 1 | 1 | 0 | 2 |
| 0 | 0 | 1 | 1 | 0 | 0 | 0 | 1 | 1 | 1 | 3 |
| 0 | 0 | 0 | 0 | 0 | 0 | 0 | 1 | 1 | 2 | 0 |
| 0 | 0 | 1 | 0 | 0 | 0 | 0 | 1 | 1 | 3 | 1 |

0 0 1   ← t → ← w →

TABLE E

Error at (p) / Error at (q)

| d | c | b | a | r | q | p | n | m | d | c | b | a | r | q | p | n | m |
|---|---|---|---|---|---|---|---|---|---|---|---|---|---|---|---|---|---|
| x | x | 0 | 0 | 0 | 0 | 1 | 1 | 1 | x | x | 0 | 0 | 0 | 1 | 0 | 1 | 1 |

0 0 1   ← t → ← w →   0 1 0   ← t → ← w →

Then there are two possibilites:

*a.* the bits *d* and *c* are = 0 (0 polarity is maintained);

*b.* the bits *d* and *c* are = 1 (Transition from 0 to 1).

Example 5

The bit value transition is detected at the correct moment but the bit *b* is received incorrectly.

TABLE H

Error at b

| d | c | b | a | r | q | p | n | m | Should be time interval | Is detected if |
|---|---|---|---|---|---|---|---|---|---|---|
| 0 | 0 | 1 | 0 | 0 | 0 | 0 | 1 | 1 | 0 | 1 |
| 0 | 0 | 0 | 0 | 0 | 0 | 0 | 1 | 1 | 1 | 0 |
| 0 | 0 | 1 | 1 | 0 | 0 | 0 | 1 | 1 | 2 | 3 |
| 0 | 0 | 0 | 1 | 0 | 0 | 0 | 1 | 1 | 3 | 2 |
| | | | | | 0 | 0 | 1 | | | |
| | | t | | | w | | | | | |

The above examples 1 through 5 relate to the transition in the signal from 0 to 1.

Consequently, in the case of a signal value change from 1 to 0, the same time units should be found in the case of similar errors. It will be clear that, by assigning the time interval encoding at transitions from 0 to 1 to the inverted value of corresponding encodings at transitions from 1 to 0, inverse error patterns are produced, as a result of which the interpretation of the time units is equal to that of the similar ones shown in tables C through H. When a decision is taken concerning a transition in the signal value and the time unit is determined, the t-bits stored in the shift register would immediately be transformed to the new value. This is to prevent that a new majority decision is taken at a premature moment during the further shifting procedure.

The operation at the receiving end of the system is shown in the time sequence diagram of FIG. 6. The signal at sr is intended to be identical to that at st in FIG. 5, but an error has occurred in both code words in the shaded places.

Considering the error in the first code word, after a transition has been detected (see the first transition of dl and d2 in FIG. 6), the position of the trigger stages BR, AR and RR is ascertained. In this case, it appears that the trigger stage RR has assumed the 1 state when it should be at the 0 state like stages BR and AR. Thus, in accordance with Table B (last case), the transition of the signal at output et is to occur at time interval 3, although in the absence of the error the transition should have occurred at time interval 0. This error corresponds to that described in Example 1. After the transition of the signal at output et, the stages BR, AR and RR will be uniformly reset to the 0 state by trigger P4 to thereby cancel the error, so that upon advancement of the bits through the shift register stages, the above discussed error cannot lead to a subsequent detection of a false transition.

The error in the second code word results in trigger stage PR being at the 0 state after the transition has first been detected (see the second transition of *d*1 and *d*2 in FIG. 6), which transition detection has thus been delayed one bit, not having occurred until the lead bit of the code word reached trigger stage NR. Had the transition been detected at the proper time, stages BR, AR and RR would have been at 0,1 and 1 states, respectively; and accordingly, the transition of the signal at output et would have occurred at time interval 1 as seen in Table B. However, since the shift register 16 was stepped along one extra time due to the error, the stages BR, AR and RR are at 1,0 and 1 states, respectively, and the transition of the signal at output et actually occurs at time interval 2 in Table B.

The aforegoing describes the system for the situation in which two bits are included in the code word for indicating the place of a transition in a fixed repetition timing pattern. When only a single bit is used for this purpose, the features can be simplified. This appears from the possibility of deactuating a portion of the encoding circuit at the transmitting end by means of the switch SW (FIG. 1) and using a reforming device at the receiving end in accordance with FIG. 3 which has a simpler second logic circuit 22 which only responds to two stages of the shift register 16 but otherwise operates in the same manner as the reforming device of FIG. 2. The encoding to be used in this case appears from Table I in which the second circuit in the reforming device is arranged in accordance with Table J.

TABLE I

| transition from 1 to 0 (b rqp) | place in pattern | transition from 0 to 1 (b rqp) |
|---|---|---|
| 0 000 | 0 | 1 111 |
| 1 000 | 1 | 0 111 |

TABLE J

| transition from 1 to 0 (b r) | place in pattern | transition from 0 to 1 (b r) |
|---|---|---|
| 0 0 | 0 | 1 1 |
| 1 0 | 1 | 0 1 |
| 0 1 | 1 | 1 0 |
| 1 1 | 1 | 0 0 |

Also in this case, the possibly occurring deformation when an error creeps in is maximally ± 20 percent.

When an error occurs in the place of bit *a* or *b*, the resulting deformation self-evidently amounts to maximally 10 percent.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A system for the transfer of information relating to the point of time and direction of transitions between two states of a biphase input signal comprising:

a transmitting means including, means to scan said biphase input signal at a fixed repetition rate, and encoding means responsive to said scanning means and having means representing said input signal in a code word having a plurality of bits indicating the direction of transition and at least one bit indicating the time of occurrence of the transition relative to a fixed pattern of repetition time intervals, wherein the fixed pattern is repeated at a selected multiple of the repetition time intervals; and a receiving means including, shift register means having an input and a plurality of stages receiving the code word and additionally having one stage in excess of the number of bits in the code word, output means for generating a biphase output signal, and logic circuit means connected to said shift register stages for controlling the state of said output means in accordance with the code word bits in said shift register stages, said logic circuit means being capable of effecting a majority decision as regards a plurality of shift register stages including said excess stage to ascertain the direction of the transition.

2. The system according to claim 1 wherein the number of bits of the code word does not exceed the number of scannings at said fixed repetition rate per shortest time interval to be expected between transitions of the biphase input signal divided by the selected multiple of the repetition time intervals.

3. The system according to claim 2 wherein said scanning means includes a shift register having a stage for each bit of the code word.

4. The system according to claim 3 wherein said encoding means includes a plurality of gates adapted to control at least one stage of the scanning means shift register to assume said at least one bit indicating the time of occurrence of the transition.

5. The system according to claim 4 wherein said encoding means includes a trigger means responsive to a transition of the input signal in one direction for setting a plurality of said scanning means shift register stages with code word bits in accordance therewith, and another trigger means responsive to a transition of the input signal in another direction for resetting said plurality of scanning means shift register stages with code word bits in accordance therewith.

6. The system according to claim 3 including a divider circuit means for stepping along the shift register of the scanning means in response to a predetermined number of clock pulses.

7. The system according to claim 3 including an output transmitting stage connected to the shift register for transmitting the code word to the receiving means.

8. The system according to claim 1 including trigger means responsive to the occurrence of transitions of the biphase output signal for controlling some of the stages of the shift register.

9. The system according to claim 1 including a clock controlled divider means for stepping the shift register in accordance with a predetermined number of clock pulses.

* * * * *